United States Patent
Basso et al.

(10) Patent No.: US 9,749,328 B2
(45) Date of Patent: *Aug. 29, 2017

(54) ACCESS CONTROL LIST-BASED PORT MIRRORING TECHNIQUES

(71) Applicant: International Business Machines Corporation, Armonk, NY (US)

(72) Inventors: Claude Basso, Nice (FR); Todd A. Greenfield, Rochester, MN (US); Joseph A. Kirscht, Rochester, MN (US); Natarajan Vaidhyanathan, Carrboro, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/284,859

(22) Filed: May 22, 2014

(65) Prior Publication Data

US 2015/0341316 A1    Nov. 26, 2015

(51) Int. Cl.
*H04L 12/743* (2013.01)
*H04L 29/06* (2006.01)
*H04L 29/08* (2006.01)
*H04L 12/64* (2006.01)

(52) U.S. Cl.
CPC ........ *H04L 63/101* (2013.01); *H04L 12/6418* (2013.01); *H04L 29/06* (2013.01); *H04L 29/08* (2013.01); *H04L 45/7457* (2013.01); *H04L 63/0236* (2013.01); *H04L 63/1408* (2013.01); *H04L 67/1095* (2013.01)

(58) Field of Classification Search
CPC .............. H04L 45/7457; H04L 41/085; H04L 43/0829; H04L 43/0876; H04L 45/00; H04L 45/54; H04L 49/30; H04L 47/10; H04L 47/2441; H04L 67/1095; H04L 63/0236; H04L 63/101; H04L 12/6418; H04L 29/06; H04L 29/08; H04L 63/1408; G06F 17/30982

See application file for complete search history.

(56) References Cited

U.S. PATENT DOCUMENTS

| | | | |
|---|---|---|---|
| 7,304,996 B1* | 12/2007 | Swenson | H04L 45/7453 370/229 |
| 7,451,267 B1 | 11/2008 | Venkatachary et al. | |
| 7,552,275 B1* | 6/2009 | Krishnan | G06F 17/30982 365/49.1 |
| 8,358,651 B1* | 1/2013 | Kadosh | H04L 12/437 370/360 |

(Continued)

OTHER PUBLICATIONS

List of IBM Patents or Patent Applications Treated As Related.

(Continued)

*Primary Examiner* — Hashem Farrokh
(74) *Attorney, Agent, or Firm* — Patterson + Sheridan, LLP

(57) ABSTRACT

Embodiments presented herein describe techniques for selecting incoming network frames to be mirrored using an access control list. According to one embodiment, an incoming frame is received. Upon determining that the incoming frame matches an entry in the access control list, a mirror field of the entry is evaluated. The mirror field identifies at least one mirroring action to perform on the frame. The identified mirroring action is performed on the frame.

9 Claims, 5 Drawing Sheets

(56) References Cited

U.S. PATENT DOCUMENTS

| | | | |
|---|---|---|---|
| 8,553,582 B1* | 10/2013 | Mizrahi | H04L 49/20 |
| | | | 370/254 |
| 8,873,392 B1 | 10/2014 | Orr | |
| 2003/0198231 A1 | 10/2003 | Kalkunte et al. | |
| 2004/0252722 A1 | 12/2004 | Wybenga et al. | |
| 2005/0114657 A1 | 5/2005 | Kumar et al. | |
| 2005/0220092 A1* | 10/2005 | LaVigne | H04L 43/028 |
| | | | 370/389 |
| 2006/0156018 A1 | 7/2006 | Lauer et al. | |
| 2007/0022479 A1 | 1/2007 | Sikdar et al. | |
| 2008/0304498 A1* | 12/2008 | Jorgensen | H04L 12/4641 |
| | | | 370/401 |
| 2010/0020814 A1 | 1/2010 | Thyni | |
| 2011/0161580 A1 | 6/2011 | Shah et al. | |
| 2011/0299414 A1 | 12/2011 | Yu et al. | |
| 2013/0034100 A1 | 2/2013 | Goyal et al. | |
| 2013/0218853 A1 | 8/2013 | Bullis et al. | |
| 2014/0119177 A1 | 5/2014 | Delregno et al. | |
| 2015/0006808 A1 | 1/2015 | Miller et al. | |
| 2015/0339240 A1 | 11/2015 | Basso et al. | |
| 2015/0341269 A1 | 11/2015 | Basso et al. | |
| 2015/0341270 A1 | 11/2015 | Basso et al. | |
| 2015/0341364 A1 | 11/2015 | Basso et al. | |
| 2015/0358245 A1 | 12/2015 | Basso et al. | |

OTHER PUBLICATIONS

Basso et al., "Access Control List-Based Port Mirroring Techniques", U.S. Appl. No. 14/520,842, filed Oct. 22, 2014.

U.S. Appl. No. 14/284,927, entitled "Skipping and Parsing Internet Protocol Version 6 Extension Headers to Reach Upper Layer Headers", filed May 22, 2014.

U.S. Appl. No. 14/284,788, entitled "Atomically Updating Ternary Content Addressable Memory-Based Access Control Lists", filed May 22, 2014.

U.S. Appl. No. 14/284,811, entitled "Supporting Access Control List Rules That Apply to TCP Segments Belonging to 'Established' Connection", filed May 22, 2014.

U.S. Appl. No. 14/296,574, entitled "Unified Framework for Isolating Multicast and Broadcast Frames to a Traffic Class Separate From a Traffic Class Used for Unicast Frames", filed Jun. 5, 2014.

* cited by examiner

ACCESS CONTROL LIST-BASED PORT MIRRORING TECHNIQUES

BACKGROUND

In computer networking, an access control list (ACL) can refer to a strictly ordered list of rules applied to port numbers or IP addresses available on a host or other network. An ACL may be implemented on networking devices, such as routers and switches, to filter traffic and provide network security. For instance, an ACL may include rules that specify certain network hosts or addresses that a switch should permit or deny access to a network.

An ACL rule may be divided into a condition and an action. That is, if a certain condition is satisfied, then the networking device performs the corresponding action. For example, a rule may specify, as a condition, receiving an incoming frame from a certain IP address. The rule specifies, as a corresponding action, to discard the frame. Typically, networking devices configured with ACLs execute an action associated with the first matching rule in the list.

An ACL may be implemented in a networking device using ternary content addressable memory (TCAM). TCAM is a type of computer memory that allows for high speed searching in the ACL. A networking device may store rule conditions in a TCAM table and rule actions in an addressable array structure, such as a static random-access memory (SRAM) table. When the device matches a condition in the TCAM, the TCAM provides a memory address of the corresponding action in the SRAM.

SUMMARY

Embodiments presented herein disclose a method for mirroring an incoming frame based on an access control list stored in a ternary content addressable memory (TCAM). Upon determining that the incoming frame matches an entry in the access control list, a mirror field of the entry is evaluated. The mirror field identifies at least one mirroring action to perform on the frame. The method also includes performing the identified mirroring action on the frame.

DETAILED DESCRIPTION

Figure 1:
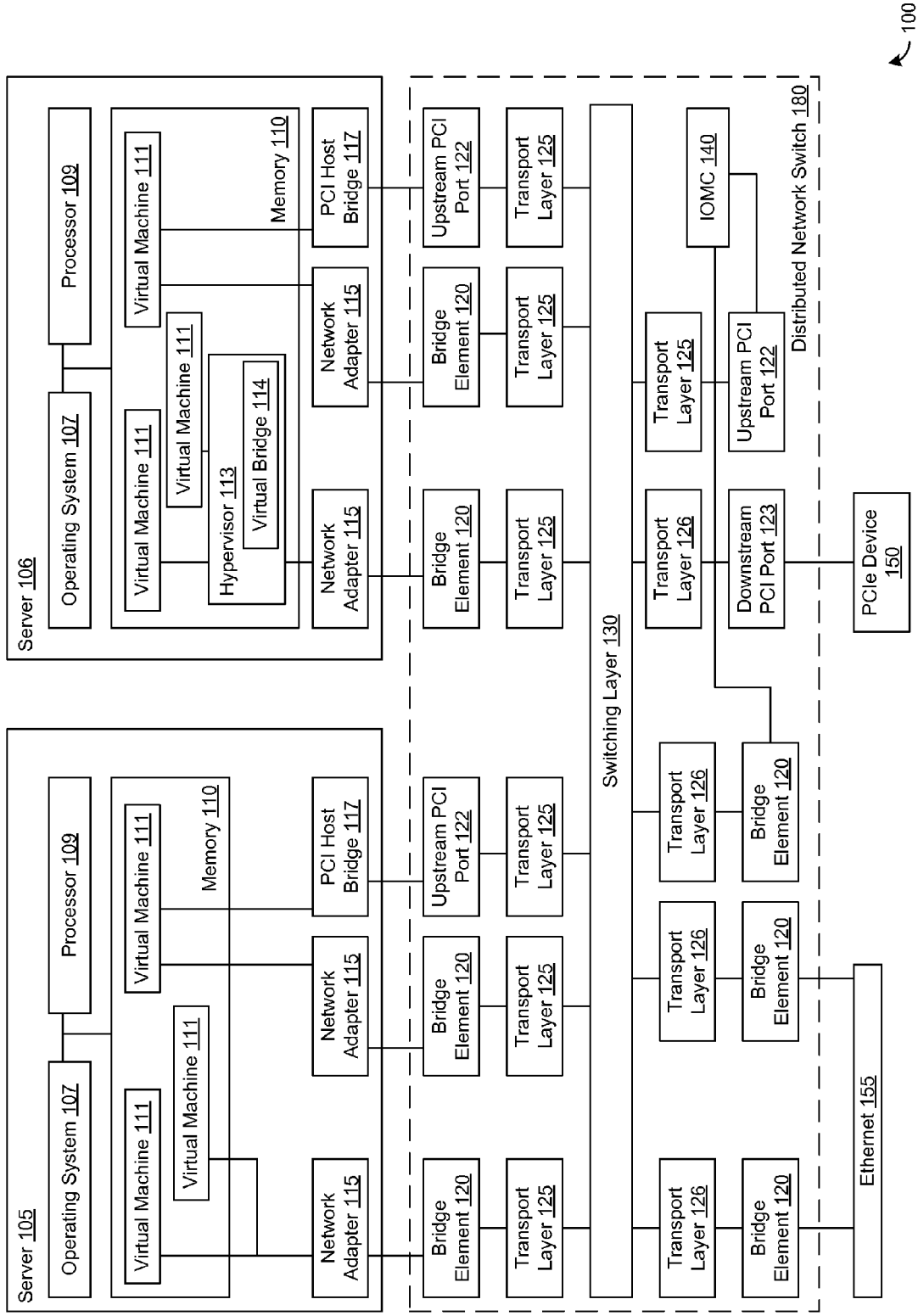
FIG. 1 illustrates a system architecture that includes a distributed network switch, according to one embodiment.

Generally, a Layer 2 switch (or other networking device) may support port mirroring. Port mirroring refers to sending a copy of network frames seen on a first port or virtual local area network (VLAN) to a second port. Doing so allows a switch to monitor network traffic on the second port, without disrupting traffic over the first port. Currently, a switch may use configuration registers to implement port mirroring. For example, the configuration registers may include bit fields to allow port mirroring to be enabled. Because mirroring an entire flow of incoming frames may be undesired due to doubled traffic, the switch may also include fields to allow for further filtering, such as logical port filtering, filtering by VLAN, and the like. A switch may also allow for sFlow sampling, which is a mechanism that allows approximately every nth frame in a flow of frames to be mirrored to another port. Typically, a switch provides for each flow to pass through a single sFlow sampler module.

However, the implementations described have several drawbacks. For instance, although configuration registers may allow for filtering flows of incoming network frames by logical ports and VLANs, filtering subsets of a given flow is unsupported. For example, assume that, based on a configuration of the network switch, all frames corresponding to a given logical port are to be mirrored. Under this implementation, the switch is unable to exclude frames arriving from a particular IP address. Instead, all incoming frames corresponding to the logical port are mirrored. In addition, another drawback is that flows of frames are passed to the same sFlow sampler module. That is, using the implementations discussed above, the switch is unable to support separate sampler modules for different flows. Thus, each sampled flow is sampled at the same rate as other sampled flows arriving at the switch.

Embodiments presented herein describe techniques for selecting flows of frames to be mirrored. More specifically, the techniques provide an access control list (ACL) in a switch, or other networking device, that is configured to handle various port mirroring configurations. A 2-bit mirroring field is included in an ACL action that supports the various port mirroring conditions, such as mirroring with logical port filters, VLAN filters, sFlow sampling, etc. As a result, ACL rules may be configured to test certain conditions and mirror frames matching such conditions according to corresponding port mirroring actions.

In addition, embodiments provide techniques that allow distinct sFlow sampler modules to be applied to different flows of incoming frames. Typically, a TCAM-based ACL may include an ACL metering component. Such a component may include multiple control blocks, each mapping to a given TCAM entry. The metering control blocks are generally configured to perform metering algorithms on incoming network traffic. In one embodiment, the metering control blocks are configured to handle sFlow sampling. If sampling is enabled (and metering is disabled) in a given metering control block, the metering control block may perform sFlow sampling on an individual flow of frames.

Advantageously, modifying an ACL to support port mirroring functions on a network switch alleviates the drawbacks discussed above. The 2-bit mirroring field in an ACL action allows different mirroring rules to be specified on flows of frames arriving to the network switch. Therefore, a network switch may select a more refined and granular subset to frames to be mirrored. In addition, by modifying the existing ACL metering component to accommodate sFlow sampling, different flows may be sampled using distinct sFlow sampling modules.

Note, the following description relies on a distributed network switch as a reference example of a networking device that uses a TCAM-based access control list to provide port mirroring functionality. However, one of skill in the art will recognize that techniques are applicable in other contexts related to using an access control list to implement port mirroring capabilities. For example, the techniques may also generally be adapted to other networking devices that maintain an access control list, regardless of the particular structures used to implement the access control list. Similarly, the following description uses a static random-access memory (SRAM) table as a reference example for a structure that stores corresponding actions of a TCAM-based access control list. However, any addressable array structure (e.g., a Register Array, Register, File, an EDRAM, and the like) may be used to store such actions.

FIG. 1 illustrates a system architecture 100 that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

Further, in one embodiment, the bridge elements 120 include a ternary content addressable memory (TCAM) table and an addressable array structure, such as a static random-access memory (SRAM) table, which collectively provide an access control list (ACL). The ACL maintains a list of rules that the bridge elements 120 apply in managing data frames processed within the distributed network switch 180. The TCAM table stores a condition for each rule. And the SRAM stores an action performed when a corresponding rule condition is met.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
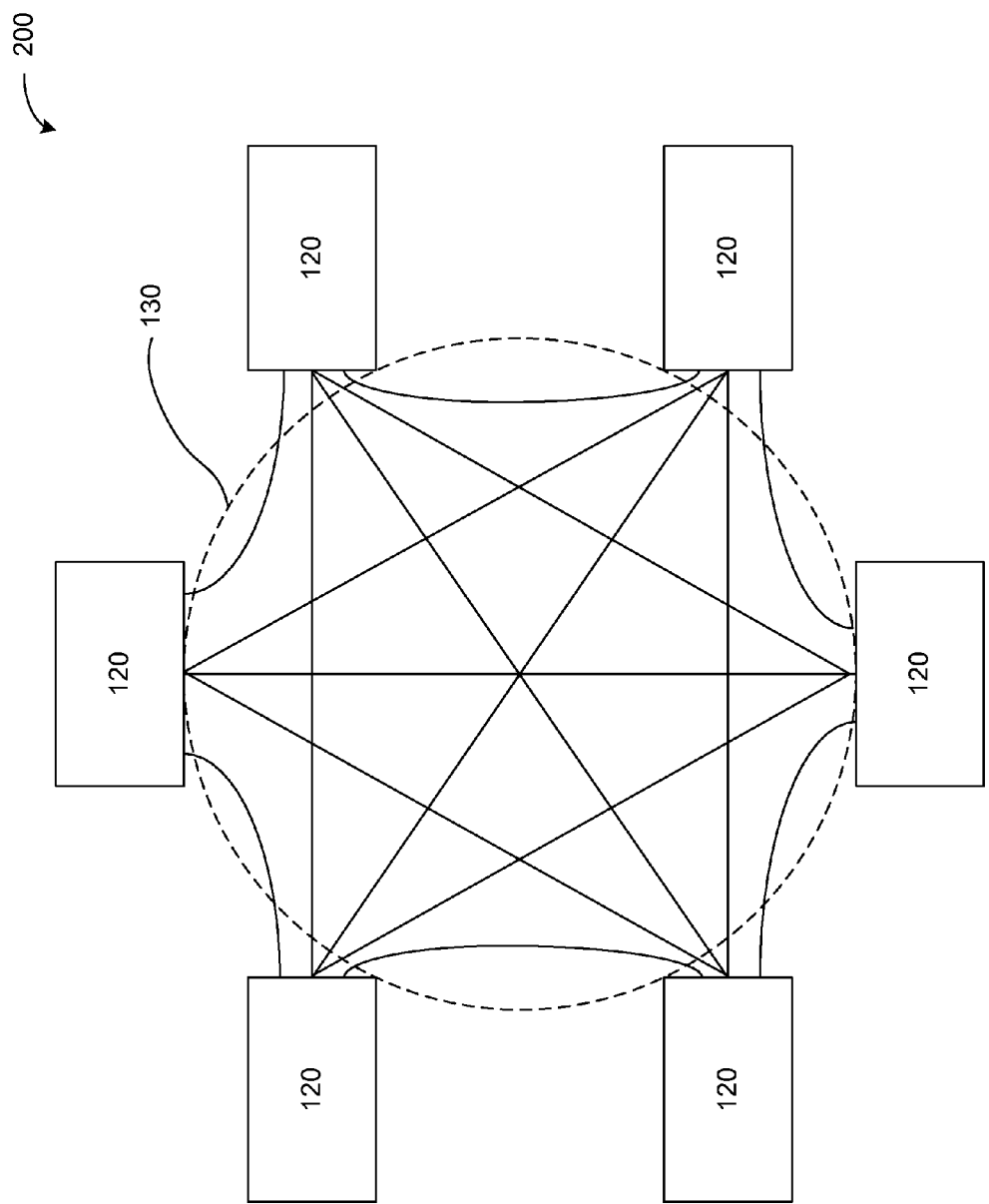
FIG. 2 illustrates components of a distributed network switch, according to one embodiment.

FIG. 2 illustrates a virtual switching layer, according to one embodiment. Each bridging element 120 in the system 100 is connected to each other using the switching layer 130 via a mesh connection schema. That is, no matter the bridging element 120 used, a cell (i.e., data packet) can be routed to another bridging element 120 located on any other switch module. This may be accomplished by directly connecting each bridging element 120—i.e., each bridging element 120 has a dedicated data path to every other bridging element 120.

In one embodiment, each switch module is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

In one embodiment, each individual bridge element 120 manages its own ACL using a TCAM and an SRAM residing within the bridge element 120. An example bridge element 120 is further shown in FIG. 3.

Figure 3:
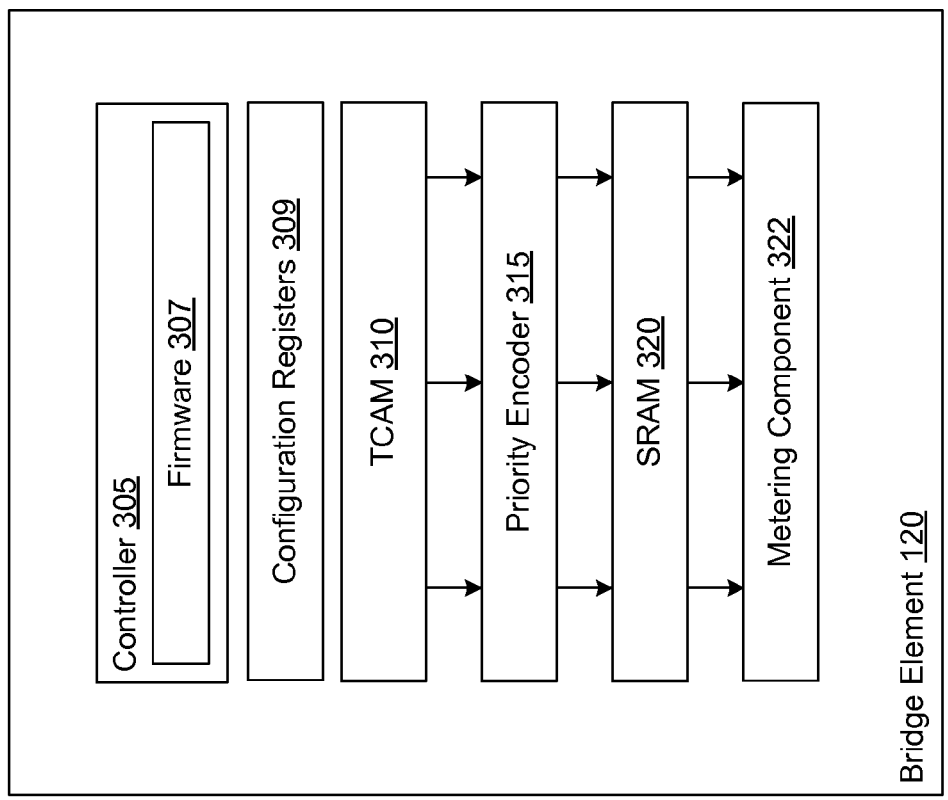
FIG. 3 illustrates components of a bridge element configured to select frames to be mirrored based on an access control list, according to one embodiment.

FIG. 3 illustrates components of a bridge element 120 configured to select frames to be mirrored based on an ACL, according to one embodiment. As shown, the bridge element 120 includes a controller 305, configuration registers 309, a TCAM 310, a priority encoder 315, an SRAM 320, and a metering component 322. The controller 305 includes firmware 307. The firmware 307 provides various modules for managing aspects of the bridge element 120, such as ACLs maintained in the bridge element 120.

The configuration registers 309 include readable/writable mode fields that provide independent mirroring control for each physical Ethernet port of the bridge element 120. Such port-level mirroring fields may include support for logical port filters, VLAN filters, and sFlow sampling for a given physical port. For example, the configuration registers 309 may provide enabling flags for port mirroring, logical port filtering, VLAN filtering, and sFlow sampling. Likewise, the configuration registers 309 may include fields indicating corresponding logical port values, VLAN IDs, and the like.

An ACL may act as an interface for the mirroring capabilities of the bridge element 120. Doing so allows more flexibility for the bridge element 120 to select certain subsets of incoming flows of frames to be mirrored to a given port. The TCAM 310 provides a rule table that stores conditions of the ACL based on rule priority. Each entry in the table provides a condition. When the bridge element 120 receives a frame in which the frame characteristics match one or more rule entries, the relative position of the higher priority entry is encoded into an address, which is then used to access the corresponding rule action stored in the SRAM 320. For example, the rule may match various properties to an incoming frame, such as a service IP address, a source/destination IP address, and the like. When properties of a frame match one or more of the conditions in the TCAM 310, the TCAM 310 outputs a bit vector of length equal to a number of rows in the TCAM 310. For the rows of the TCAM 310 that matched the properties of the frame, the corresponding bits within the vector are active, with all others being inactive. The priority encoder 315 receives the bit vector from the TCAM 310, selects the one having the highest priority, encodes the position to an address, and applies the address to the SRAM 320 to retrieve the corresponding action.

In one embodiment, action entries in the SRAM 320 include a 2-bit mirroring field. Table I provides descriptions for each corresponding mirroring field value.

TABLE I

Mirroring Actions Specified by ACL Rule

| Field Value | Description |
|---|---|
| 00 | ACL rule does not influence mirroring behavior |
| 10 | Mirror the frame; skip port-level sFlow processing and mirroring criterion decision |
| 01 | Mirror the frame if port-level sFlow sampling permits |
| 11 | Do not mirror the frame; skip sFlow processing |

As shown, a mirroring field value of 00 indicates that the ACL does not influence mirroring behavior. More specifically, if an incoming frame matches an ACL rule and the action has a mirroring field value of 00, then the bridge element 120 follows a mirroring logic specified in the configuration registers 309. A mirroring field value of 10 in an ACL action indicates that the bridge element 120 mirror the frame without performing any logical port filtering, VLAN filtering, or sFlow sampling. A mirroring field value of 01 in an ACL action indicates that the bridge element 120 mirror the frame only if sFlow sampling permits. A mirroring field value of 11 indicates that the bridge element 120 does not mirror the frame.

The metering component 322 is generally configured to limit bandwidth for flows that match an ACL rule. Further, the metering component 322 may include metering control blocks for each rule in the ACL. When the metering component 322 receives a metering request, the metering component 322 reads a corresponding control block, performs several metering algorithms, and returns a color output of either green or red based on results of the algorithms. A green output indicates that a particular flow conforms to a committed rate of a bandwidth profile and may be delivered. A red output indicates that the packets do not conform to the committed or to an excess rate of the bandwidth profile and are typically discarded.

In one embodiment, the metering control blocks in the metering component 322 may be configured to perform sFlow sampling. An ACL rule may map to its own metering control block. Such a configuration allows incoming flows to pass through different sFlow sampling modules. In sampling mode, a corresponding metering control block decrements a counter associated with a sampling rate (with a jitter value) each time a matching frame of a given flow is received by the bridge element 120. When the counter reaches zero after receiving a frame, the metering control block resets the counter and outputs a green value to the controller 305. Once received, the controller 305 mirrors the frame.

Figure 4:
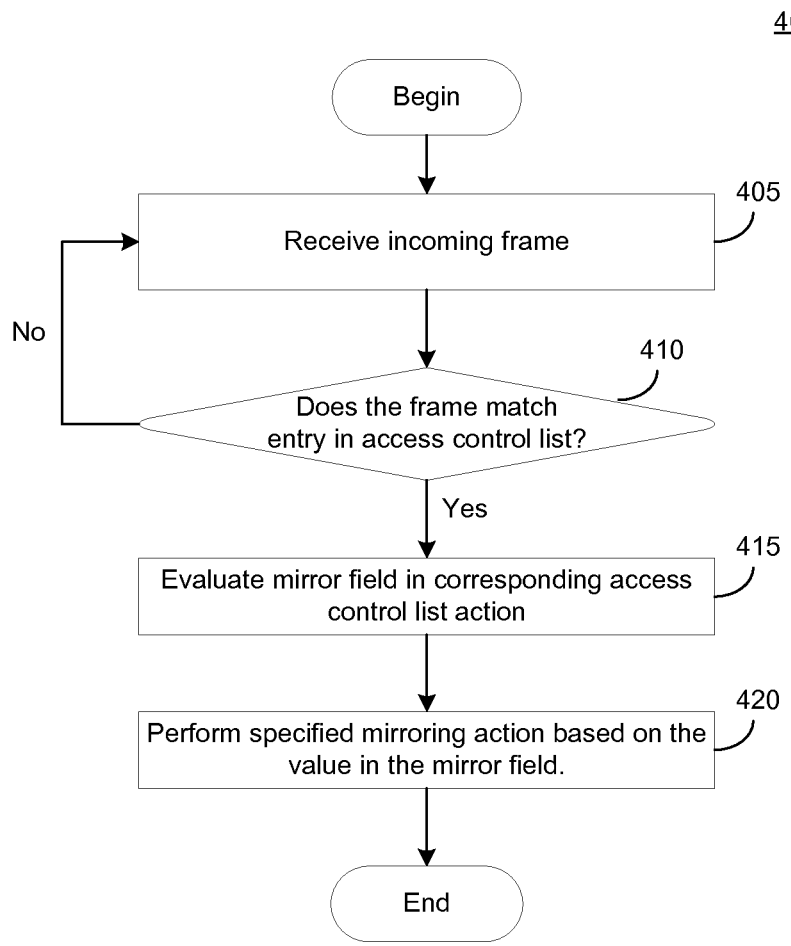
FIG. 4 illustrates a method for mirroring frames based on a given access control list action setting, according to one embodiment.

FIG. 4 illustrates a method 400 for mirroring a frame using an ACL, according to one embodiment. At step 405, the bridge element 120 receives an incoming frame. The controller 305 evaluates the frame against the access control list to determine whether the frame matches any entry in the list (at step 410). If the frame does not match any entry, the controller 305 processes the frame normally. If any port-level mirroring settings are enabled in the configuration registers 309, the controller 305 performs mirroring according to the settings.

At step 415, if the frame matches an entry in the ACL, the controller 305 evaluates the 2-bit mirror field in the corresponding control list action. Doing so determines what mirroring actions, if any, to take on the frame. As noted in Table 1, the mirror field may have four possible outcomes.

At step 420, the controller performs the specified mirroring action based on the value specified in the mirror field.

Figure 5:
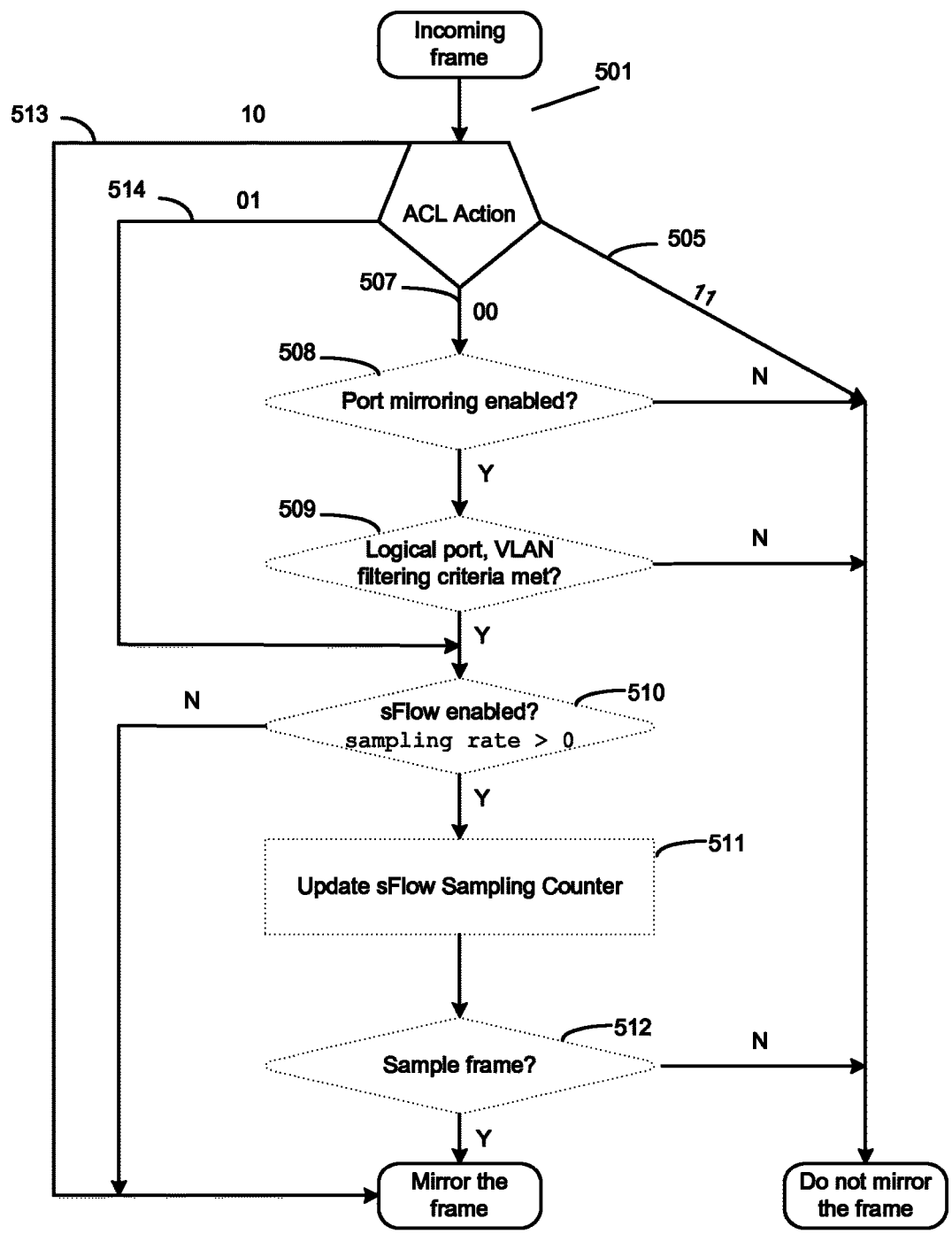
FIG. 5 illustrates a conceptual diagram for mirroring frames based on a given access control list action setting, according to one embodiment.

FIG. 5 illustrates a conceptual diagram that further describes steps 415 and 420 of the method 400, according to one embodiment. Illustratively, at 501, an incoming frame matches a rule in the ACL. The pentagon labeled "ACL Action" is a decision block with arrows pointing out that represent the four outcomes determined by the mirror field of the corresponding ACL action.

At 505, if the mirror field has a value of 3 (11), the controller 305 bypasses the port-level mirroring settings specified in the configuration register 309 and does not mirror the frame. At 507, if the mirror field has a value of 0 (00), the controller 305 performs a basic mirroring flow according to the mirroring settings specified in the configuration register 309. In other words, the ACL does not have any influence on the mirroring of the frame.

The basic mirroring flow is represented by the blocks having a dotted outline. As shown, the controller 305 determines whether port-level mirroring is enabled in the configuration register 309 (at 508). If not, the controller 305 does not mirror the frame. If so, the controller 305 then determines whether any logical port or VLAN filtering criteria are met (at 509). If not, the controller 309 does not mirror the frame.

If so, at 510, the controller 305 then determines whether sFlow sampling is enabled. If not, the controller 309 mirrors the frame. If so, an sFlow sampler module updates a counter for the frame, e.g., by decrementing the counter. At 512, if the counter is zero, the controller 305 mirrors the frame (i.e., the frame is sampled), and the sFlow sampler module resets the counter. If the counter is a non-zero value, then the controller 305 does not mirror the frame.

If the mirroring field of the ACL action has a value of 2 (10) or 1 (01), then the controller 305 skips portions of the basic mirroring flow. For instance, at 513, if the mirroring field has a value of 2 (10), the controller 305 skips the basic flow entirely and mirrors the frame. That is, the controller 305 does not determine whether port mirroring or any filters are enabled. Rather, the controller 305 mirrors the frame directly. At 514, if the mirroring field has a value of 1 (01), then the controller 305 bypasses the logical port and VLAN filtering checks and instead determines whether sampling is enabled (at 510). If so, the sFlow sampler module performs the sampling logic discussed above to determine whether to mirror the frame.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory storing a program, which, when executed on the processor, performs an operation for mirroring an incoming frame based on an access control list, the operation comprising:
storing mirroring settings in one or more configuration registers;
upon determining that the incoming frame matches an entry in the access control list, identifying an action to perform on the frame, wherein the entry includes a field which includes a plurality of bits specifying one of a plurality of actions, and wherein the plurality of actions that can be specified by the plurality of bits comprises one or more of:
(i) performing mirroring according to the mirroring settings specified in the configuration registers,
(ii) bypassing the mirroring settings specified in the configuration registers and mirroring the frame,
(iii) bypassing logical port and VLAN filtering criteria in the mirroring settings specified in the configuration registers and mirroring the frame if a sampling process is enabled and permits the mirroring of the frame, and
(iv) bypassing the mirroring settings specified in the configuration registers and not mirroring the frame; and
performing the identified action on the frame.

2. The system of claim 1, wherein performing the sampling process comprises:
decrementing a sample counter by one; and
upon determining the sample counter is equal to zero:
mirroring the frame, and
resetting the sample counter to a non-zero value.

3. The system of claim 2, wherein performing the sampling process further comprises, upon determining the sample counter has a non-zero value after decrementing the sampling counter, declining to mirror the frame.

4. The system of claim 1, wherein the access control list specifies conditions for processing a frame according to a rule and actions for managing incoming network frames in a distributed networking switch.

5. A computer program product, comprising:
a non-transitory computer-readable storage medium having computer-readable program code embodied therewith, the computer-readable program code configured to perform an operation for mirroring an incoming frame based on an access control list, the operation comprising:
storing mirroring settings in one or more configuration registers;
upon determining that the incoming frame matches an entry in the access control list, identifying a action to perform on the frame, wherein the entry includes a field which includes a plurality of bits specifying one of a plurality of actions, and wherein the plurality of actions that can be specified by the plurality of bits comprises one or more of:
(i) performing mirroring according to the mirroring settings specified in the configuration registers,
(ii) bypassing the mirroring settings specified in the configuration registers and mirroring the frame,
(iii) bypassing logical port and VLAN filtering criteria in the mirroring settings specified in the configuration registers and mirroring the frame if a sampling process is enabled and permits the mirroring of the frame, and
(iv) bypassing the mirroring settings specified in the configuration registers and not mirroring the frame; and
performing the identified action on the frame.

6. The computer program product of claim 5, wherein performing the sampling process comprises:
decrementing a sample counter by one; and
upon determining the sample counter is equal to zero:
mirroring the frame, and
resetting the sample counter to a non-zero value.

7. The computer program product of claim 6, wherein performing the sampling process further comprises, upon determining the sample counter has a non-zero value after decrementing the sampling counter, declining to mirror the frame.

8. The computer program product of claim 5, wherein the sampling process is performed in a metering control block of the access control list.

9. The computer program product of claim 5, wherein the access control list specifies conditions for processing a frame according to a rule and actions for managing incoming network frames in a distributed networking switch.

* * * * *